(12) United States Patent
Sun et al.

(10) Patent No.: US 9,425,998 B2
(45) Date of Patent: Aug. 23, 2016

(54) ANALOG NYQUIST SHAPING OF A LOW PASS FILTERED TRANSMISSION SYSTEM

(71) Applicant: INTEGRA RESEARCH AND DEVELOPMENT, LLC, Latham, NY (US)

(72) Inventors: Chen-Kuo Sun, Escondido, CA (US); Paul N. Huntley, Poway, CA (US); Dingbo Chen, San Diego, CA (US)

(73) Assignee: INTEGRA RESEARCH AND DEVELOPMENT, LLC NY (US)

( * ) Notice: Subject to any disclaimer, the term of this patent is extended or adjusted under 35 U.S.C. 154(b) by 0 days.

(21) Appl. No.: 14/200,592

(22) Filed: Mar. 7, 2014

(65) Prior Publication Data

US 2015/0256361 A1 Sep. 10, 2015

(51) Int. Cl.
*H03H 7/30* (2006.01)
*H03H 7/40* (2006.01)
*H03K 5/159* (2006.01)
*H04L 25/03* (2006.01)

(52) U.S. Cl.
CPC .............. *H04L 25/03834* (2013.01)

(58) Field of Classification Search
CPC ............ H04L 25/03057; H04L 2025/0349
USPC ........................................ 375/233
See application file for complete search history.

(56) References Cited

U.S. PATENT DOCUMENTS

| | | | |
|---|---|---|---|
| 6,122,120 A * | 9/2000 | Shimoda | 360/46 |
| 6,275,990 B1 * | 8/2001 | Dapper | G06F 17/14 |
| | | | 348/E7.07 |
| 7,345,604 B2 | 3/2008 | Watson | |
| 8,537,949 B1 * | 9/2013 | Cirit et al. | 375/371 |
| 8,774,262 B2 * | 7/2014 | Bhoja et al. | 375/233 |
| 2004/0228021 A1 * | 11/2004 | Yamazaki | 360/51 |
| 2012/0033685 A1 * | 2/2012 | Doblar et al. | 370/535 |
| 2012/0183092 A1 * | 7/2012 | Pelekhaty | H04L 25/0384 |
| | | | 375/285 |

\* cited by examiner

*Primary Examiner* — Tanmay Shah
(74) *Attorney, Agent, or Firm* — Nydegger & Associates

(57) ABSTRACT

An analog signal processing device for equalizing a low pass filter to create a Nyquist filter in accordance with the present invention includes a low pass filter for passing a predetermined bandwidth, and a tapped delay filter connected with the low pass filter to create the Nyquist filter. In more detail, the tapped delay filter is used to sample an input analog signal having a predetermined symbol rate. The samples from the input signal are then respectively weighted to establish a system transfer function for the Nyquist filter. The purpose here is to minimize both inter-symbol interference and transmission bandwidth. A decision circuit can be provided to convert the input signal into a desired data format for creation of an output signal to be transmitted by the data transmission system. Also, the Nyquist filter can be selectively evaluated as an "eye diagram" and the system transfer function appropriately adjusted accordingly.

15 Claims, 2 Drawing Sheets

ANALOG NYQUIST SHAPING OF A LOW PASS FILTERED TRANSMISSION SYSTEM

FIELD OF THE INVENTION

The present invention pertains generally to data transmission systems. More particularly, the present invention pertains to systems and methods for equalizing a low pass filter to create a Nyquist filter response in a data transmission system in order to reduce the bandwidth of a data input signal and reject high frequency noise. The present invention is particularly, but not exclusively, useful for systems and methods which employ hardware components and avoid Digital Signal Processing (DSP) techniques to create a Nyquist filter response in a data transmission system, to thereby achieve a much higher operational speed with less power.

BACKGROUND OF THE INVENTION

It is well known that both analog and digital signals can be transmitted over an electronic data transmission system. It is also well known that analog and digital signals are fundamentally different. Despite their fundamental differences, however, analog and digital signals still have certain common characteristics. In particular, for signal transmission purposes, both digital and analog signals exhibit identifiable frequency characteristics which allow digital signals to be processed as analog signals. Specifically, for an essentially digital signal, the related frequency characteristic is its symbol rate (i.e. the rate at which signals, e.g. digits or state changes, are transmitted along a particular electronic connection).

In the context of electronic data transmission systems, and with specific concern for signal distortions which can be caused by frequency interference during a transmission, there are many applications which employ a low pass filter in order to improve the Signal-to-Noise-Ratio (SNR) of the signal. As the name implies, a low pass (analog) filter is one which freely passes signals of all frequencies (symbol rates) that are below a reference value (i.e. the cut-off frequency). Not surprisingly, many low pass filters require equalization (i.e. alteration or compensation) in order to efficiently and efficaciously perform their intended function in a data transmission system.

A specific filter response for reducing the bandwidth of a data input signal which is akin to a low pass filter in several respects, is provided by what is commonly referred to as a Nyquist filter. The advantage of a Nyquist filter is essentially two-fold. For one, in the time domain, a Nyquist filter provides optimal suppression of inter-symbol interference. Simultaneously, in the frequency domain, a Nyquist filter provides for effective adjacent channel rejection. Heretofore, however, Nyquist filters have required the implementation of relatively sophisticated software for their operations. Moreover, Nyquist filters typically employ Digital Signal Processing (DSP) techniques that make them impractical at high data rates. Also, certain types of Nyquist filters appear to be impractical due to poor time response characteristics. Despite these shortcomings, Nyquist filters have certain desirable attributes for processing analog signals.

With the above in mind, it is an object of the present invention to provide a system and method for achieving a transfer function for a data transmission system that approximates a Nyquist filter response. Another object of the present invention is to establish an architecture for a data transmission system which avoids Digital Signal Processing (DSP) to achieve a much higher operational speed for the system with less power. Still another object of the present invention is to provide a system and method for equalizing a low pass filter using relatively inexpensive hardware components, such as a low pass filter in combination with a tapped delay filter, to create a Nyquist filter response for a data transmission system. Another object of the present invention is to provide a system and method for equalizing a low pass filter to reject high frequency interference. Yet another object of the present invention is to provide a system and method for equalizing a low pass filter to create a Nyquist filter response in a data transmission system which is easy to implement, is simple to use, and is comparatively cost effective.

SUMMARY OF THE INVENTION

For the present invention, an analog signal processing device is provided for a data transmission system. In detail, the analog signal processing device equalizes a low pass filter to create a Nyquist filter response. In accordance with the present invention the analog signal processing device essentially includes: a low pass filter; at least one tapped delay filter; and a decision circuit.

In combination, both the low pass filter and the tapped delay filter function linearly. Thus, they can be positioned in-line, as desired (i.e. the tapped delay filter can be positioned either upstream or downstream from the low pass filter). If two tapped delay filters are to be used, one of them can be positioned upstream from the low pass filter and the other downstream from the low pass filter. For all embodiments of the present invention, it is important that the low pass filter have a predetermined bandwidth. As envisioned for the present invention, the low pass filter is preferably a linear phase analog filter. It may, however, be a transmission line, a shunt capacitor, a series inductor, or a semiconductor transistor.

For the present invention, the tapped delay filter(s) is(are) connected with the low pass filter to sample an input signal, such as a Non-Return-to-Zero (NRZ) signal, a Pulse-Amplitude-Modulation (PAM) signal, a Duo-Binary (DB) signal, or a signal from a symbol generator. Importantly, in each instance, the input signal will have a fixed (predetermined) symbol rate which is typically greater than one Giga Baud.

In an operation of the present invention, as an input signal passes through the tapped delay filter, samples are taken from the signal. These samples are then passed through a plurality of taps and are respectively weighted to establish a system transfer function which will cause the system to act as a Nyquist filter. For the present invention, each tapped delay filter has an N number of taps, and an n number of samples are taken during each symbol cycle of the input signal. In this context, both N and n are integers greater than one, and N is equal to or greater than n. As envisioned for the present invention, the tapped delay filters will preferably be a Finite Impulse Response (FIR) filter, an Infinite Impulse Response (IIR) filter, a Continuous-Time Linear Equalizer (CTLE) filter or a combination of these filters. In the event, and regardless of the particular type component chosen for use with the present invention, the analog signal processing device of the present invention functions to minimize inter-symbol interference and optimize a minimum transmission bandwidth for the signal being processed.

After an analog signal has passed through the Nyquist filter of the present invention, the decision circuit converts the processed signal into a desired data format. For this conversion the decision circuit will preferably be either a data slicer, a Decision-Feedback Equalizer (DFE), a data decoder, or an Analog-to-Digital (AD) converter. The resultant output signal is then further transmitted by the data transmission system.

An added feature for the present invention is its ability to monitor and assess system performance. To do this an oscilloscope with its display can be connected between the output of the Nyquist filter and the input of the decision circuit, and used to create an eye diagram of the signal at that point in the system. As is well known in the pertinent art, an eye diagram (or eye pattern) can be displayed and used to evaluate noise and inter-symbol interference at the input to the decision circuit.

With the above in mind, it is to be appreciated that in order to implement a data transmission system in accordance with the present invention, it is first necessary to know the performance characteristics of the low pass filter that are to be equalized. It is also necessary to determine what is needed for equalizing the low pass filter in order to achieve a desired system transfer function. For this determination an operational combination of selected components needs to be considered. Once the system components are assembled, and a system transfer function has been established, the system can then be operated open-loop and uncontrolled, with periodic monitoring, assessment and recalibration, if necessary.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
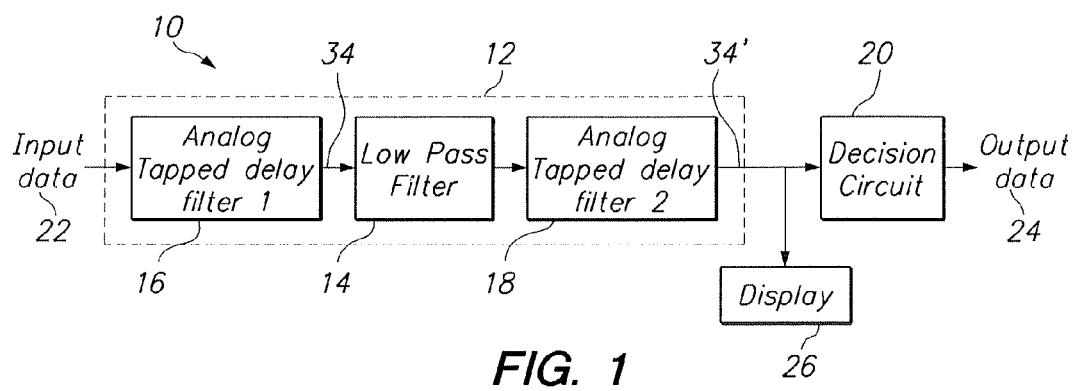
FIG. 1 is a schematic block diagram of operative components for creating a Nyquist filter in accordance with the present invention.

Referring initially to FIG. 1, a data transmission system in accordance with the present invention is shown and is generally designated 10. As shown, the system 10 includes a Nyquist filter 12 which, in turn, includes a low pass filter 14, a first analog tapped delay filter 16, and a second analog tapped delay filter 18. In this combination, the low pass filter 14 is preferably a linear phase analog filter of a type well known in the pertinent art. Alternatively, however, the low pass filter 14 may be a transmission line, a shunt capacitor, a series inductor, a semiconductor transistor, or it may be any other type of analog filter that is well known in the art. For the present invention, the tapped delay filters 16 and 18 will typically be of the same type, and they may be respectively selected to be a Finite Impulse Response (FIR) filter, an Infinite Impulse Response (IIR) filter, or a Continuous-Time Linear Equalizer (CTLE) filter; all of which are also well known in the pertinent art. Further, the tapped delay filters 16 and 18 may be a selected combination of various of these different type filters.

It is to be appreciated that, although a first analog tapped delay filter 16 and a second analog tapped delay filter 18 are shown for the Nyquist filter 12 in FIG. 1, an operation of the system 10 requires only one of these filters 16/18. If only one tapped delay filter (16 or 18) is used, it can be positioned either upstream from the low pass filter 14 (e.g. as shown for tapped delay filter 16) or downstream from the low pass filter 14 (e.g. as shown for tapped delay filter 18).

FIG. 1 also shows that the system 10 includes a decision circuit 20 which is connected into the system 10 downstream from the Nyquist filter 12. Operationally, this decision circuit 20 may be either a data slicer, a Decision-Feedback Equalizer (DFE), a data decoder, or an Analog-to-Digital (AD) converter. Regardless which type of decision circuit 20 is used, the purpose of the present invention is to convert input analog signals 22 into output signals 24 having a desired data format that is necessary for their future use. As envisioned for the present invention, the input analog signals may be either a Non-Return-to-Zero (NRZ) signal, a Pulse-Amplitude-Modulation (PAM) signal, a Duo-Binary (DB) signal, or a signal from a symbol generator.

Still referring to FIG. 1, it will be seen that a display 26 is connected between the output of the Nyquist filter 12 and the input to the decision circuit 20. With this connection, the display 26 is used to monitor, evaluate and assess system performance. To do this, the display 26 will typically be part of an oscilloscope (not shown) which can be selectively (i.e. optionally) used to create an eye diagram 28 (see FIG. 4) of the signals between the output of the Nyquist filter 12 and the input to decision circuit 20. As is well known in the pertinent art, an eye diagram (or eye pattern) 28 can be displayed and used to evaluate noise and inter-symbol interference in a signal.

Figure 2:
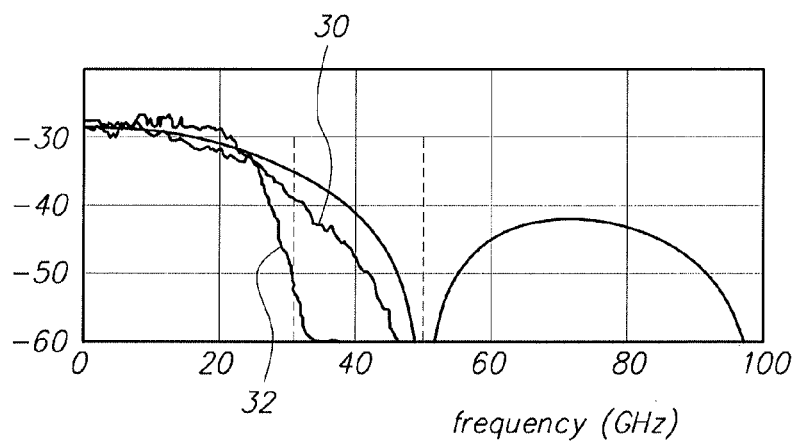
FIG. 2 is a graphic presentation of an equalized frequency response for the present invention in comparison with a typical frequency response from an analog filter without equalization.

An operational benefit that is achieved from the system 10 can be appreciated with reference to FIG. 2. Specifically, FIG. 2 compares an exemplary non-equalized spectrum response 30 with an equalized spectrum response 32. In this example, the non-equalized spectrum response 30 is indicative of results when only a low pass filter 14 is used. On the other hand, with the equalization provided by system 10, the equalized spectrum response 32 is the result. The comparison shown in FIG. 2, indicates that when an equalized low pass filter 14 is employed as intended for the present invention, the spectrum of the system 10 is reduced (i.e. by the Nyquist filter 12). And, its efficiency is improved.

Figure 3A:
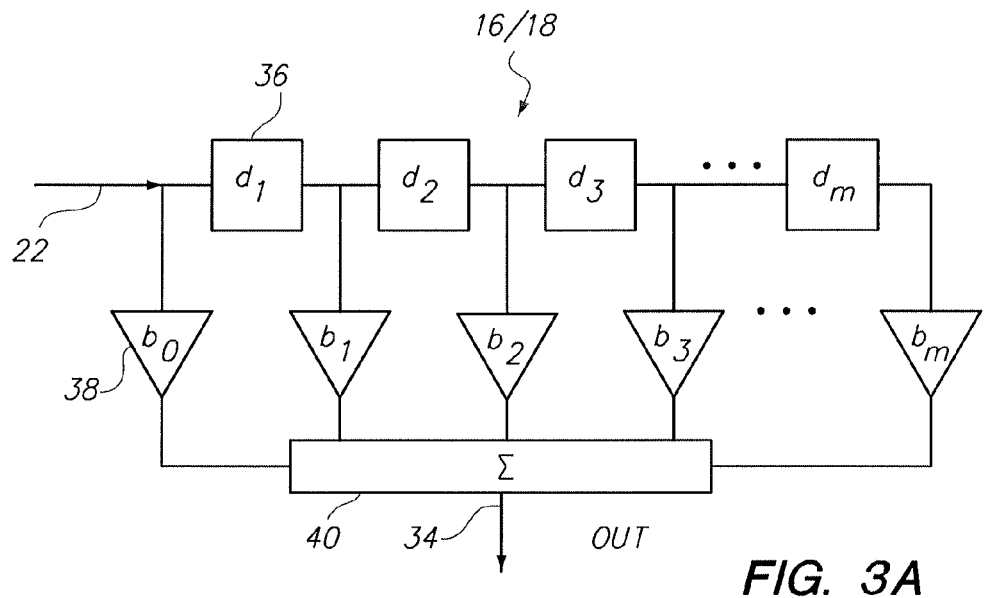
FIG. 3A is a schematic presentation of an architecture for a Finite Impulse Response (FIR) tapped delay filter.
Figure 3B:
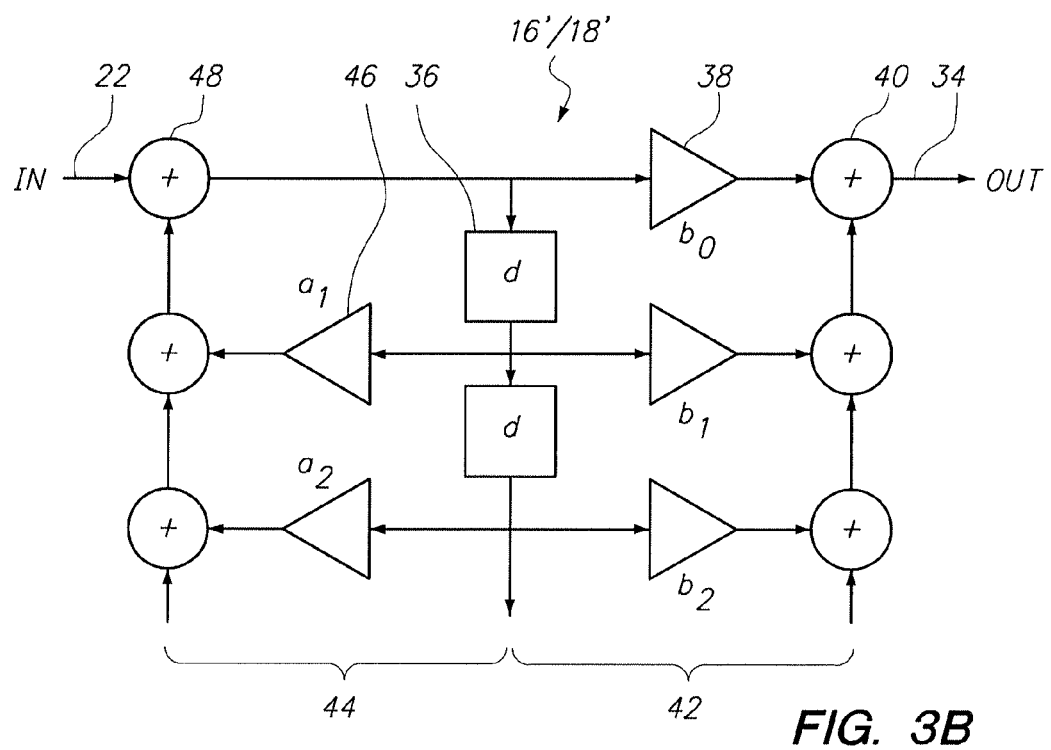
FIG. 3B is a schematic presentation of an architecture for a combination Infinite Impulse Response (IIR) filter and an FIR filter.

FIGS. 3A and 3B, respectively, show typical layouts of respective architectures for operational components of tapped filters 16 and 18. In particular, FIG. 3A shows a typical architecture for components of a Finite Impulse Response (FIR) filter, and FIG. 3B shows a typical architecture for components of a combined FIR filter and an Infinite Impulse Response (IIR) filter. FIG. 3A and FIG. 3B each show serial architectures for the respective filters.

In FIG. 3A, it will be seen that an FIR-type tapped delay filter 16/18 receives an input signal 22 that is then serially passed in the filter 16/18 through an m number of separate delays 36 (respectively $d_{1-m}$). The input signal 22 and the delayed signals ($d_{1-m}$) are each respectively sampled and the samples are amplified (weighted) by a dedicated amplifier 38 (respectively $b_{0-m}$). The delayed and amplified (i.e. weighted) signal samples are then summed at a summer 40 to reconstitute the output signal 34 or 34' (in a case where two tapped delay filters 16/18 are used, as in FIG. 1, it is the output signal 34' that is reconstituted). In either case, it is this output signal 34/34' that is converted by the decision circuit 20, and assessed by the display 26, prior to final transmission from the system 10. In the context of the present invention, each delay 36 and each connected amplifier 38, in combination, constitutes a tap.

In FIG. 3B an alternate embodiment is shown for the filters 16' and 18'. With reference to FIG. 3B it will be appreciated that each filter 16'/18' includes, in combination, an FIR section 42 and an IIR section 44. Functionally, the FIR section 42 is the same as, or similar to, the FIR-type filter 16/18 disclosed above with reference to FIG. 3A. Keeping this in mind, the IIR section 44 of filters 16'/18', like the FIR section 42, is of a type that is well known in the pertinent art wherein signal samples are amplified (weighted) by a dedicated amplifier 46 (respectively $a_{1-m}$). These signal samples are then summed by a summer 48 and passed to the summer 40 for contribution to the output 34/34'. Thus, the $a_{1-m}$ coefficients collectively define the IIR section 44, and the $b_{0-m}$ coefficients collectively define the FIR section 42. As envisioned for the present invention, the filter 16'/18' is used whenever it is determined that the overall performance of the Nyquist filter 12 can be effectively improved.

Figure 4:
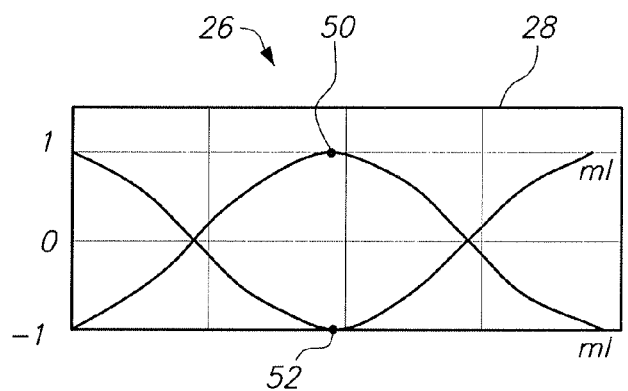
FIG. 4 is an illustration of an idealized eye diagram.

FIG. 4 shows a typical eye diagram 28 which is created by an oscilloscope when a signal (e.g. output signal 34 or 34') is repetitively sampled for vertical input, and its symbol rate is used for the horizontal sweep. In operation, such an eye diagram 28 is a diagnostic tool which is useful for evaluating noise and inter-symbol interference that are introduced by the system 10 into the final output signal 24. In particular, for this evaluation a closure of the distance between points 50 and 52 in the eye diagram 28 indicates increased distortion in the waveform of the output signal 24. On the other hand, an open eye diagram 28 corresponds with minimal distortion. As implied above, such a diagnostic tool can be used to selectively adjust the system 10 by appropriately weighting delays in the tapped delay filters 16/18 to establish an effective system transfer function.

While the particular Analog Nyquist Shaping of a Low Pass Filtered Transmission System as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A device for equalizing a low pass filter to create a Nyquist filter response for analog signals in a data transmission system which comprises:
    a low pass filter for passing a predetermined bandwidth of an input analog signal; and
    a tapped delay filter connected with the low pass filter to create the Nyquist filter for sampling the input analog signal, wherein the analog signal has a predetermined symbol rate, wherein the symbol rate is based on a symbol cycle, and wherein samples from the input analog signal are passed through an N number of taps and an n number of samples are taken during each symbol cycle and wherein each sample is respectively weighted with a dedicated amplitude to establish a system transfer function for equalizing the low pass filter to create a Nyquist filter, and further wherein both N and n are integers greater than one and N is equal to or greater than n to over-sample the analog signal to minimize both inter-symbol interference and transmission bandwidth.

2. A device as recited in claim 1 further comprising a decision circuit to convert the input analog signal into a desired data format for creation of an output signal to be transmitted by the data transmission system.

3. A device as recited in claim 2 further comprising an oscilloscope selectively connected to the Nyquist filter for creating an eye diagram to evaluate noise and inter-symbol interference.

4. A device as recited in claim 1 wherein the low pass filter is selected from the group consisting of a linear phase analog filter, a transmission line, a shunt capacitor, a series inductor, and a semiconductor transistor.

5. A device as recited in claim 1 wherein the symbol rate is greater than 1 Giga Baud.

6. A device as recited in claim 1 wherein the tapped delay filter is a first tapped delay filter and the device further comprises a second tapped delay filter, wherein the first tapped delay filter is connected with the low pass filter downstream from the low pass filter in the data transmission system and the second tapped delay filter is connected with the low pass filter upstream from the low pass filter in the data transmission system.

7. A device as recited in claim 6 wherein the first and second tapped delay filters are respectively selected from the group consisting of a Finite Impulse Response (FIR) filter, an Infinite Impulse Response (IIR) filter, and a Continuous-Time Linear Equalizer (CTLE) filter.

8. A device as recited in claim 1 wherein the input analog signal is selected from the group consisting of a Non-Return-to-Zero (NRZ) signal, a Pulse-Amplitude-Modulation (PAM) signal, a Duo-Binary (DB) signal, and a signal from a symbol generator.

9. A device as recited in claim 2 wherein the decision circuit is selected from the group consisting of a data slicer, a Decision-Feedback Equalizer (DFE), a data decoder, and an Analog-to-Digital (AD) converter.

10. A device for equalizing a low pass filter to create a Nyquist filter response for analog signals in a data transmission system which comprises:
    a low pass filter for passing a predetermined bandwidth of an input analog signal;
    a tapped delay filter connected with the low pass filter to create the Nyquist filter for sampling the input analog signal, wherein the input analog signal has a predetermined symbol rate, wherein the symbol rate is based on a symbol cycle, and wherein samples from the input analog signal are passed through an N number of taps and an n number of samples are taken during each symbol cycle and wherein each sample is respectively weighted with a dedicated amplitude to establish a system transfer function for equalizing the low pass filter to create a Nyquist filter, and further wherein both N and n are integers greater than one and N is equal to or greater than n to over-sample the analog signal to minimize both inter-symbol interference and transmission bandwidth; and
    a decision circuit, to convert the input analog signal into a desired data format for creation of an output signal to be transmitted by the data transmission system.

11. A device as recited in claim 10 further comprising an oscilloscope selectively connected to the Nyquist filter for creating an eye diagram to evaluate noise and inter-symbol interference.

12. A device as recited in claim 10 wherein the tapped delay filter is a first tapped delay filter and the device further comprises a second tapped delay filter, wherein the first tapped delay filter is connected with the low pass filter downstream from the low pass filter in the data transmission system and the second tapped delay filter is connected with the low pass filter upstream from the low pass filter in the data transmission system.

13. A method for assembling an analog signal processing device for equalizing a low pass filter to create a Nyquist filter response for analog signals in a data transmission system which comprises the steps of:
   providing a low pass filter for passing a predetermined bandwidth of an input analog signal;
   connecting a tapped delay filter to the low pass filter to create the Nyquist filter for sampling the input analog signal, wherein the input analog signal has a predetermined symbol rate, wherein the symbol rate is based on a symbol cycle, and wherein samples from the input analog signal are passed through an N number of taps and an n number of samples are taken during each symbol cycle; and
   weighting each sample with a dedicated amplitude to establish a system transfer function for equalizing the low pass filter to create a Nyquist filter, and further wherein both N and n are integers greater than one and N is equal to or greater than n to over-sample the analog signal to minimize both inter-symbol interference and transmission bandwidth.

14. A method as recited in claim 13 further comprising the steps of:
   connecting a decision circuit to the Nyquist filter to convert the input analog signal into a desired data format for creation of an output signal to be transmitted by the data transmission system; and
   selectively connecting an oscilloscope to the Nyquist filter for creating an eye diagram to evaluate noise and inter-symbol interference.

15. A method as recited in claim 14 wherein the tapped delay filter is a first tapped delay filter and the method further comprises step of connecting a second tapped delay filter with the Nyquist filter, wherein the first tapped delay filter is connected with the low pass filter downstream from the low pass filter in the data transmission system and the second tapped delay filter is connected with the low pass filter upstream from the low pass filter in the data transmission system.

* * * * *